United States Patent [19]
Henriksson

[11] 3,973,917
[45] Aug. 10, 1976

[54] METHOD FOR THE PURIFICATION OF SELENIUM BY PRECIPITATION FROM A MELT

[75] Inventor: Sten Tycho Henriksson, Skelleftehamn, Sweden

[73] Assignee: Boliden Aktiebolag, Stockholm, Sweden

[22] Filed: July 30, 1973

[21] Appl. No.: 383,604

[30] Foreign Application Priority Data
Aug. 4, 1972 Sweden.............................. 10172/72

[52] U.S. Cl........................... 23/293 R; 23/305 R; 23/273 SP; 423/510; 75/134 H; 156/616 R; 156/605
[51] Int. Cl.²........................................ C01B 19/00
[58] Field of Search............ 23/293 R, 293 A, 305, 23/301 SP, 273 SP; 423/510, 508; 75/134 H; 202/206; 156/603, 605, 616, 624

[56] References Cited
UNITED STATES PATENTS

| | | | |
|---|---|---|---|
| 651,826 | 6/1900 | Coleman............................ | 202/206 |
| 1,863,346 | 6/1932 | Moore ................................ | 202/206 |
| 2,554,425 | 5/1951 | Storment............................ | 202/206 |
| 2,739,046 | 3/1956 | Pfann................................ | 23/293 R |
| 2,739,088 | 3/1956 | Pfann................................ | 23/293 R |
| 3,378,409 | 4/1968 | Hurle................................ | 23/301 SP |
| 3,453,370 | 6/1969 | Kennedy........................... | 23/301 SP |

OTHER PUBLICATIONS
The Electrochemical Society, Escoffery et al., 1946, pp. 127 to 137.

Primary Examiner—Stephen J. Emery
Attorney, Agent, or Firm—Stevens, Davis, Miller & Mosher

[57] ABSTRACT

The present invention relates to a method and apparatus for purifying selenium or its alloys by precipitation. The method is characterized in that a smaller portion of a larger amount selenium or selenium alloy is kept at the respective transition temperature between solid and liquid phases while the remaining portion is maintained at a higher temperature for a time sufficiently long to allow a substantial concentration of foreign elements in the smaller portion.

The apparatus is characterized in that it consists of a glass vessel having a height approximately 10 times its diameter, provided with temperature indicators governing devices controlling the heat supplied to electrical elements arranged around the vessel, it also being provided with a tightly-fitting hood and a gas evacuation device.

3 Claims, 6 Drawing Figures

Fig. 6

COOLING AND VACUUM

VOLATILE IMPURITIES DISPERSED IN GAS PHASE
HALOGENS, SE-, S-COMPONDS AND $AS_2 O_3$

PHASE CHANGE: SOLID CRYSTALLINE SE ⇌ LIQUID AMORPHOUSE SE

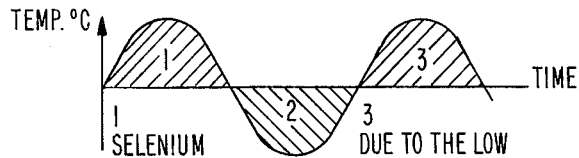

1 SELENIUM AS A LIQUID IMPURITIES DIFFUSE INTO THE LAYER

2 SELENIUM CRYSTALLIZES. IRREVERSIBLE PRECIPITATION OF SEPARATE PHASES FOR METALS SUCH AS CU, FE, AG, AL, NI, PB ETC. ACTIVITY OF IMPURITIES IN SOLUTION DIMINISHES

3 DUE TO THE LOW ACTIVITY OF THE DISSOLVED IMPURITIES THE DIFFUSION FROM PORTIONS LYING BELOW CAN CONTINUE

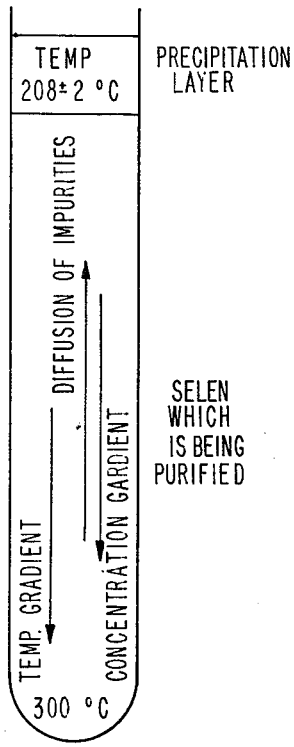

TEMP 208±2 °C — PRECIPITATION LAYER

SELEN WHICH IS BEING PURIFIED

DIFFUSION OF IMPURITIES
TEMP. GRADIENT / CONCENTRATION GARDIENT
300 °C

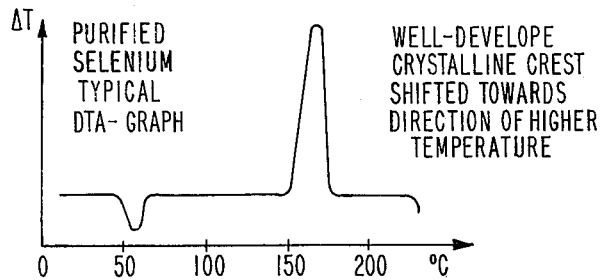

PURIFIED SELENIUM TYPICAL DTA-GRAPH

WELL-DEVELOPE CRYSTALLINE CREST SHIFTED TOWARDS DIRECTION OF HIGHER TEMPERATURE

CAUSES: ALTERATION OF STRUCTURE HOMOGENEOUS CHAIN STRUCTURE SHORTER CHAINS $SE_3$-RING BROKEN UP BY LONG-TIME HEAT TREATMENT

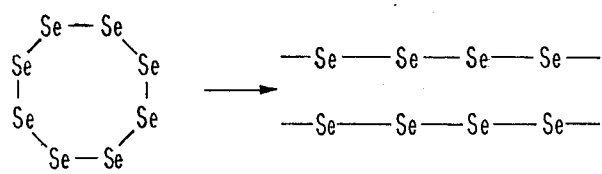

CHAIN BRANCHES AND CROSS LINKS BROKEN DUE TO THE DISAPPEARANCE OF IMPURITIES

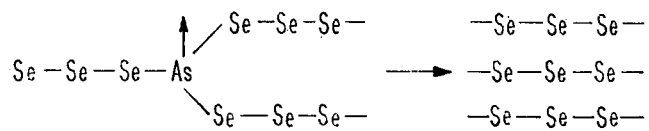

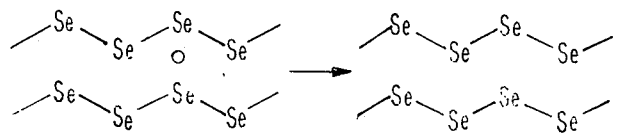

METHOD FOR THE PURIFICATION OF SELENIUM BY PRECIPITATION FROM A MELT

The present invention relates to a method for the purification of selenium from small quantities of foreign material in the selenium by treatment of a selenium melt.

Selenium has attained important use in technology due to its photo-electric qualities, and also due to the possibility of using it as a semi-conductor. Selenium is never absolutely pure, but contains foreign matter, such as impurities, to a greater or a lesser degree. For the purposes mentioned, however, one often desires selenium which is purer than that now commercially available.

Selenium melts at about 220°C, but has no sharply defined melting point, and goes from the solid via a soft semi-liquid state to a low-viscosity liquid. The low viscosity state is obtained at temperatures above about 250°–260°C. Viscosity thus diminishes with increasing temperature. In the melt, selenium molecules are assumed to have polymer structure and to be built up from ring- or chain-shaped units. Both these forms are to be found side by side in the melt. The proportion between them can vary depending on how the selenium has been produced and treated. It is known that temperature has great influence. One thus generally talks about "the antecedents" of the selenium as significant for its physical properties and structure.

On cooling, the melt becomes a solid at a temperature of between 200°–220°C. Transition to the solid state is not sharper defined either, as selenium can be found in several more or less solid or semi-solid states. In the solid state selenium can either be amorphous or crystalline. The crystalline form is stable, but amorphous selenium can also be kept for a long time, preferably in an oxygen-free atmosphere and in the dark, if the temperature is low, e.g. under about 10°–15°C. Crystallisation can also be prevented by the addition of foreign substances to the selenium. Arsenic is such a substance. Melted selenium can be completely transformed to an amorphous solid glassy state. Such a transformation can, for example, take place by quick cooling of a melt. Quick cooling of the melt is often done by dropping the selenium into cold water or on to a cooled surface having good heat conductivity, — a metal plate for example. Small round balls or flakes are then formed, which are usually known as granulated selenium. If the melt is cooled slowly, selenium is transformed into a polycrystalline state. Depending on cooling conditions, different mixing proportions can thus be obtained between solid amorphous and crystalline selenium.

Different elements suh as metals, semi-metals and halogens may form impurities in the selenium. In the melt, impurities are regarded as being built into selenium rings or chains, or are present in the form of crosslinks between the selenium structures. It has also been supposed that the melted selenium can act as a solvent for impurities in molecule or ion form. The impurities are not rigidly bound to the selenium, but have a certain mobility. This mobility increases with temperature, when selenium becomes more easy-flowing. It has now surprisingly been shown that impurities can be removed from a selenium melt using a principly new method, and that it is possible to concentrate impurities to a certain part of the melt. A temperature gradient is applied to the whole melt, so that the temperature in one part of the melt is kept within the temperature range at which selenium solidifies, while the rest of the melt is kept at a higher temperature. This temperature gradient is maintained for a certain minimum, and relatively long time. The impurities in the melt then become concentrated to the part of the melt in the fusion area. The reason for this can be that solubility of impurities in selenium dimishes in connection with the transition of selenium from liquid to solid state. The saturation limit is exceeded, and impurities are precipitated as separate phases. A contributing cause may also be the structural alteration of selenium which takes place on solidification. This alteration implies that the position of the Se-atoms in relation to each other becomes more ordered, i.e. there is an increase in symmetry, and coupled with this, impurities which were previously built in to the Se-chains or rings are freed and separated.

If selenium with its impurities is considered as a solution system, then it follows that as the impurities are separated within the precipitation layer as special phases, the content of dissolved impurities in the selenium will be reduced within this area. A concentration gradient for the dissolved impurities thus arises within the whole mass of selenium, concentration increasing with the distance from the separation area. The prerequisites have thereby been created for diffusion in the selenium solution so that impurities can wander from the more remote parts to the precipitation area, for precipitation there. After a certain time a state of equilibrium is arrived at, were extensive purification of the selenium has taken place, so that the main portion of the impurities is collected in the precipitation area.

The degree of purification, and the time required to reach a certain purification will be dependent on the mobility of the impurities in the selenium liquid. As great a mobility as possible is naturally desired. Temperature and the viscosity of the liquid will be determining factors. With increased temperature viscosity decreases, and the speed of movement of the impurities increases. When the separation area is been kept at the fusion temperature for selenium, remaining parts of the melt are held at as high temperatures as possible.

The invention will now be described with reference to the attached Figures where FIG. 1 shows an apparatus according to the invention, suitable for performing the method according to the invention.

FIG. 6 gives finally a summary of the invention, schematically showing in a number of sub-figures its technical background. For practical reasons the description of the Figures is placed adjacent to them.

Figure 1:
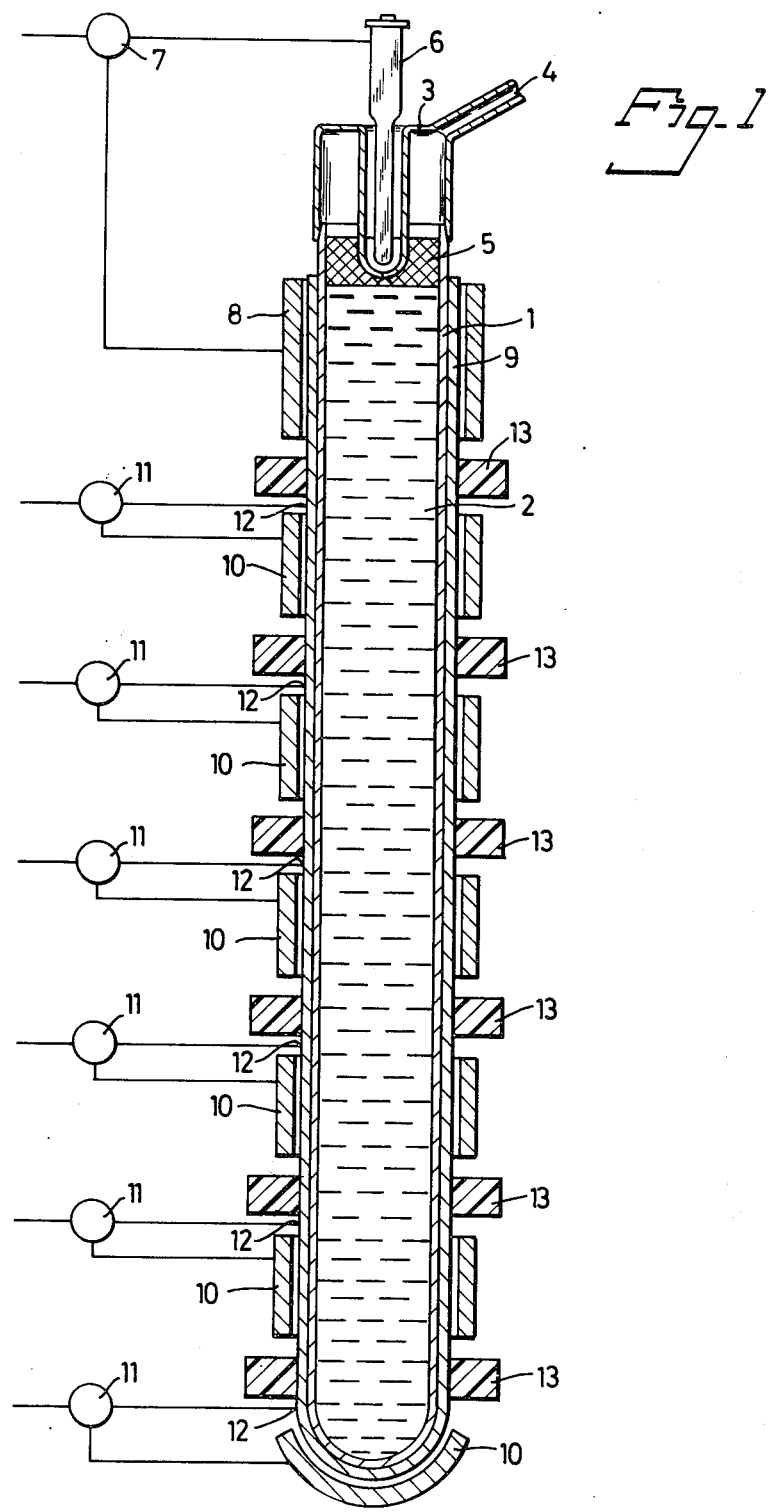

It is possible to maintain a large temperature difference between the different areas in a selenium melt, because melted selenium is a poor heat conductor. A selenium melt can for instance be kept in a suitable cylindrical vessel with great depth and a small cooled upper surface according to FIG. 1. In FIG. 1 is shown a cylindrical vessel 1, which contains liquid selenium 2. Suitably, the vessel has a length which is about 10 times its diameter. At its upper end, the vessel 1 is sealed gas-tight with a sealing hood 3, which via a pipe 4 is connected to a vacuum pump not shown. The melted selenium is so arranged in vessel 1 that the temperature within a marked-off area 5, the separation area, is permitted to vary between 206° and 210°C. A temperature-sensitive device 6, suitably a contact thermometer, is arranged in the area 5, and it senses the temperature in precipitation layer 5. A controlling device 7, depending on the indicated values for the temperature in the precipitation layer, controls the turning-on of a heat source 8, suitably a resistance element. Vessel 1 is surrounded by heat insulating cladding 9, from which the upper end of vessel 1 protrudes. This protruding portion can be forcibly cooled with cold air to obtain a heavier temperature drop in the precipitation layer. The heat insulating cladding 9 prevents too rapid temperature variations in the rest of the vessel 1. It is also possible to avoid local overheating which can cause currents in the selenium mass, adventuring the final result. Below the upper heat source 8 several other heat sources 10 are arranged, each provided with a controlling device 11, dependent on measuring values obtained from a temperature-sensitive device 12, suitably a thermoelement. With these heat sources 8 and 10, the temperature can be controlled so that it varies between 206° and 210°C in the precipitation layer and about 100°C higher at the bottom of the vessel, suitably about 300°–310°C. The different temperature-sensitive devices 12 are suitably isolated from each other by the insulating rings 13, whereas interference between the different temperature regulating devices is prevented. In such a vessel a considerable temperature drop can be accomplished.

The vessel 1 is first filled with melted selenium at about 260°C, for example, whereafter the upper portion of the melt is allowed to cool to solidification at about 108°C. At the bottom of the vessel a temperature of about 300°C can suitably be maintained. In the steady state there is thus a temperature drop of about 100°C from the bottom to the upper surface of the selenium. It is desired that a large part of this temperature drop lies between the precipitation layer and the portion of the melt lying directly under it, and that the temperature shall be on an average as high as possible in the whole melt. To obtain this, it is suitable to cool the upper portion of the vessel, for instance by blowing air over it, whereby removal of heat mainly takes place from the upper surface of the selenium. It will then be possible to regulate the upper surface temperature to the definite transition temperature, but just as well maintaining a high temperature for the lower portions of selenium liquid, viscosity thus being kept down and diffusion conditions good.

The vessel is made from a material which does not contaminate selenium. Glass is a suitable material, but resistant metals, quartz glass and ceramic materials are also usable.

To obtain satisfactory purification treatment must be carried on for a relatively long time. Treatment time is determined by the impurity content in the selenium, the amount to be treated, temperature gradient and the shape of the vessel. Treatment time may be some weeks up to several months. After satisfactory purification has been obtained, the cylindrical vessel is taken out of the apparatus arranged for heating and temperature control, and is quickly cooled to a temperature below melting point. Impurities wil have been concentrated to the portion of the selenium mass which during treatment has been kept at a temperature of about 208°C. This portion of the selenium mass may be removed, leaving the remaining purified portion. Separation may be done by using a knife, a glass knife for example, which will not contaminate the selenium, by melting with a parting fierce flame, by heat radiation or by braking off the part having concentrated impurities. It is important that separation takes place in such a way that the selenium is not re-contaminated.

The method would appear to have its most important application in the production of selenium having lower impurity contents than what has been possible to obtain according to the techniques known up to the moment. It may be said that with the method according to the invention the degree of purity has gone a step further than that in commercially available so-called highly purified selenium. To determine the content of impurities in highly purified selenium analytical methods with highly refined sensitivity are used these days. For most elements of impurity the determination level lies between 0,1 and 1 gram per metric ton. It may be said that a good quality high purity selenium is one where the impurity contents are below the level of determination using the best analytical techniques known at present.

A precipitation purification according to the invention, which is performed on the usual high purity selenium results in the concentration of impurities in the precipitation layer. It is possible analytically to show that these are present, and thus in contents lying above the level of determination of the analytical methods. As these impurities have been collected from the original high purity selenium, this must mean that the content of impurities in the purified portion of the selenium rod is still much lower. How much lower this actually is cannot naturally be calculated, as the ingoing contents are not known, other than that they have been below the level of analytic determination.

It is also possible to increase the efficiency of the methods by permitting the temperature in the layer to oscillate within certain narrow limits instead of keeping it at a constant temperature corresponding to the solidification point. On solidification selenium is in a polycrystalline state mixed with amorphous glassy selenium. Coupled with these selenium going from the disordered amorphous condition to the symmetrical crystalline state, impurities are precipitated as separate phases. Impurities which are built in to the selenium chains or cross linked between chains are freed when the selenium atoms are arranged in a crystalline lattice. The same thing happens for impurities into ring molecules when the rings are broken down on crystallization. At this stage the impurities form separate irreversible phases, thus not redissolved in the selenium solution when the polycrystalline selenium layer is once again melted. Examples here are arsenic and oxygen impurities, which are built in to the selenium chains and links, but are freed on crystallisation. Arsenic trioxide $As_2O_3$, is then precipitated, forming a separate solid phase on the selenium surface. Part of this $As_2O_3$ is evaporated from the selenium surface.

By allowing the precipitation layer temperature to oscillate, the phase transition between crystalline and amorphous state can be repeated a large number of times, and separation can thus be done with substantially greater speed and efficiency.

Figure 2:
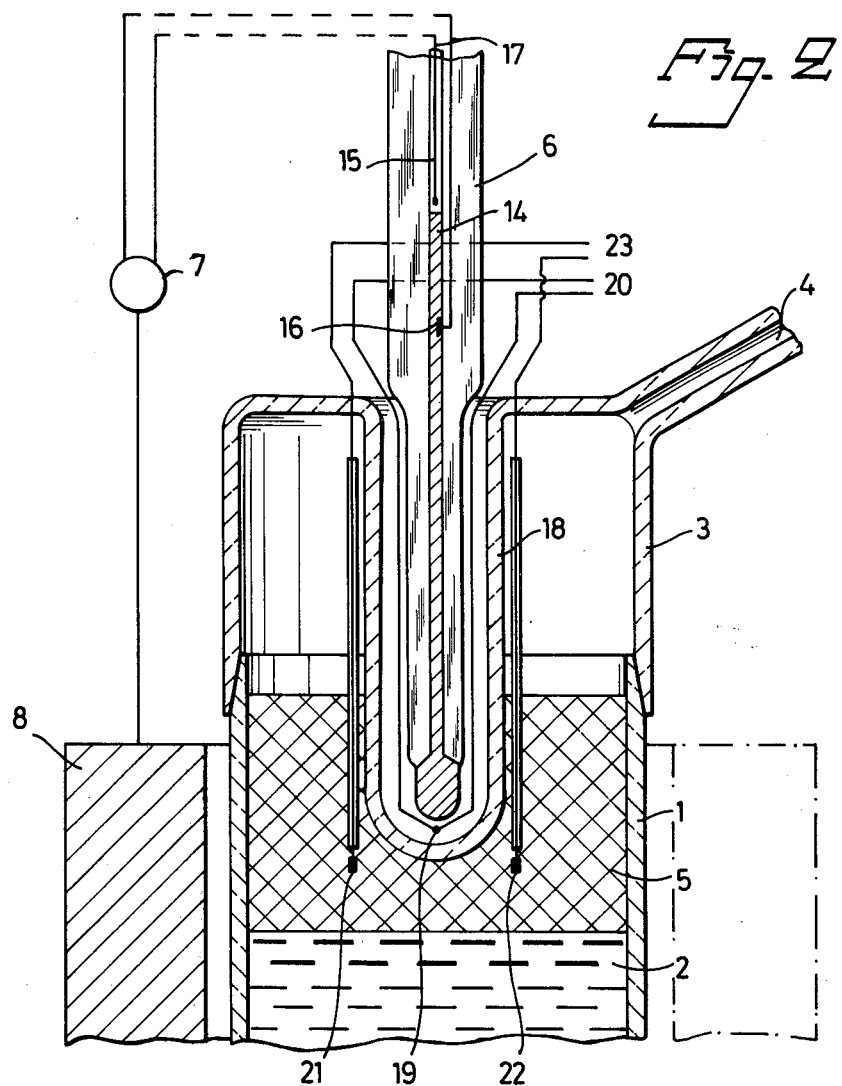
FIG. 2 shows a part of the apparatus with the precipitation layer, provided with measuring means and controlling devices.
Figure 3:
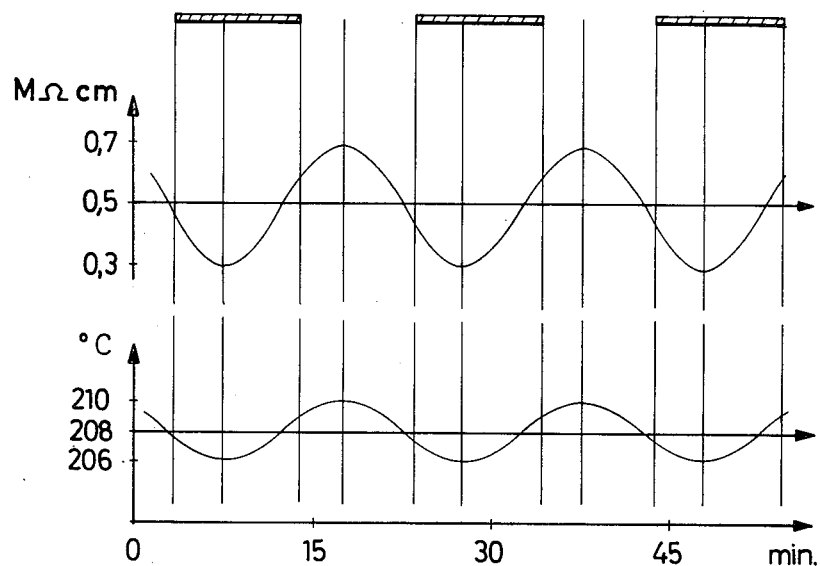
FIG. 3 shows, with two graphs, how resistivity and temperature vary with time.

FIG. 2 shows a detail of the upper part of the cylindrical vessel 1, with melted selenium 2, a sealing hood 3, which via the pipe 4 is connected to a vacuum pump, not shown. Within a defined area, the precipitation layer 5, the temperature of the melted selenium is permitted to vary between 206° and 210°C. A temperature sensitive device 6 is therefore arranged in area 5, the device being suitably a thermometer with electrical contacts. The thermometer with electrical contacts is provided with mercury filling 14 and connections of electrodes 15 and 16 which are connected to a relay 7 via circuitry 17. Relay 7 controls the turning-on of element 8. The thermometer 6 is placed in a thermometer pocket 18 which besides the thermometer also houses a thermocouple 19 connected to circuitry 20 which in its turn is coupled to a recorder. Some suitable heat conducting oil such as silicon oil is also introduced into the thermometer pocket. Finally, in the actual melting and solidifying selenium mass in the precipitation layer, two insulated platinum electrodes 21 and 22 are placed which are connected to a recorder via circuitry 23. The electrical conductivity in selenium varies considerably due to its condition. Especially in relation to whether it is in a crystalline or amorphous state. The specific resistance within the temperature range 200°–220°C is approximately 0,1 M$\Omega$cm for crystalline selenium, and ten times larger, approximately 1 M$\Omega$cm for amorphous selenium (according to Annalen der Physik, Band 14, Hafte 6-8, 1954). By measurements of resistance in the separation layer, alterations in the crystalline state of the selenium may be registered. In FIG. 3 may be seen the graphs chased by the recorder where the one graph shows temperature variations in °C against time, and the other one shows resistance in M$\Omega$cm against the same time scale. The time during which heating element 8 has been turned on are also set out in the diagram. The thermometer contact was adjusted to 208°C. The temperature in the layer oscillates with an amplitude of ± 2°C about this position, and the graph shows the frequency for phase transformation between crystalline and amorphous selenium. This is corroborated by the graph for resistance which has an exactly similar frequency having an amplitude of ± 0,2 M$\Omega$cm. The capacity of the upper element and the air conditioning are so adjusted that element "on" corresponds to approximately half the period and as mentioned, can be seen from FIG. 2. In principle the graphs have a sinusoidal form, that are somewhat unsymmetric due to the latent heat of melting and crystallisation for selenium, and the heat toning in the system caused thereby. The temperature thus increases somewhat more quickly than an ideal sinusoidal oscillation, while temperature decrease is somewhat delayed. As can be seen from FIG. 3, the contact in the thermometer is broken when cooling has reached 208°C causing the element 8 to be turned on, providing the layer with heat. At the same time crystallisation begins in the layer, which is supplied with further heat energy through the crystallisation heat generated. This means that when the temperature has changed its increase is hastened and this increase continues a while even after the thermometer contact, at 208°C, has interrupted heat supply from the element. As may be seen from FIG. 3 the resistance graph gives exactly the same picture in regard to the speed of re-distribution between crystalline and amorphous conditions in the layer. Oscillation amplitudes can naturally be moderated by adjusting the energy supplied to element 8, and regulation of air cooling. However, it has been found that the amplitudes indicated in FIG. 3 are suitable for attaining sufficient purifying effect. Period length can suitably be about 20 minutes, as in the case shown in FIG. 3.

Figure 4:
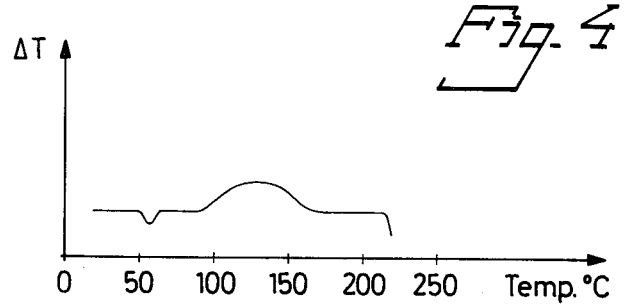
FIG. 4 shows a graph obtained on differential thermic analysis of the selenium befoe purification according to the present invention.
Figure 5:
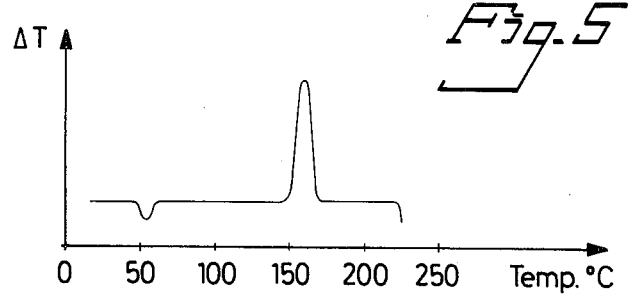
FIG. 5 shows a graph, corresponding to that in FIG. 4, for selenium purified according to the present invention.

When purifying, the whole system is thus liquid with exception of the most upper layer which is in a labile state and where there is a mixture of solid polycrystalline selenium, solid amorphous selenium and selenium liquid. As has been mentioned above, the liquid selenium is composed of chains having varying length and Se$_8$-rings (ring-shaped molecular units with eight Se-atoms). It has also become apparent that precipitation purification causes the selenium structure to be more homogeneous, apart from its also being purer. The long treatment in a heated condition probably causes the selenium rings to be broken down to shorter chains. It is also probable that the chain structures linked by impurities are broken down when the impurities are removed. The impurities are built in to branching selenium chains, or formed cross links between selenium chains. When the impurities are removed, this build-up falls into shorter simpler chains. The result is probably that selenium is more uniformly and homogeneously built up from relatively short chains. This structural alteration can be shown by so called differential thermic analyses (DTA). This kind of analysis is used to investigate energy convertions in chemical reactions and phase transitions. A special instrument called the "Thermo-analyzer, TA-1", (Mettler Inc.) is used, which registrates temperature differences ($\Delta$ T) between a sample to be investigated and an inert reference sample while the samples are put through a certain temperature range in a specified manner. Starting from these data the enthalpy alterations for the investigated material within the temperature interval can be calculated. The exothermic area for crystallisation undergoes a typical alteration by precipitation purification. Before purification the selenium taking part has usually a rather wide crystallisation area, with a crystallisation maximum at about 130°C. It has a crystallisation heat of about 5.6 KJ/mole. After purification the crystalline area becomes much more collected in a typical well defined peak, and with a displacement of the maximum crystallisation to a higher temperature of about 160°C while crystalline heat diminishes somewhat to about 4.6 KJ/mole. FIGS. 4 and 5 show typical $\Delta$ T-graphs for selenium before and after purification according to the present application. It can be clearly seen that the purified selenium according to FIG. 5 has a well defined peak at about 160°C.

In the preceding, the principles of precipitation purification and the background situation have been accounted for. Although the treatment as such can appear to be rather simple, it is obvious that the alterations of a physical and chemical nature which occur to the selenium are relatively complicated.

A lexigraphic summary of these is shown by FIG. 6. To the left is shown a schematic picture of the cylindrical vessel, and at the upper right there is a time temperature graph, below it a $\Delta$ T temperature graph and at the bottom structure graphs for before and after purification. In what follows an account will be given of the more important details in the practical execution and their results.

In the apparatus according to FIG. 1 a cylindrical vessel 1 is used for the selenium, it being made of glass or quartz glass and having a depths approximately 10 times that of its diameter. The vessel is first filled with selenium granulates. The whole vessel is thereafter heated to a temperature of about 260°C, so that all the selenium is melted, the surface of the melt lying approximately at the upper edge of the upper heating element. After this the surface temperature of the selenium is adjusted to about 200°C, remaining temperatures being suited hereto. The cover or hood of the vessel, which protrudes above the upper element is cooled by a stream of air.

With moderate air cooling of and heat departure from the upper surface, the temperature at the bottom will be about 100°C higher, or about 300°C. Air is removed from the vessel, using a protective gas, argon for example, and the vessel is also connected to a source of vacuum.

Treatment is continued for several weeks up to some months, and is chosen by experience, in relation to the content of impurities of the selenium in question. The vessel is then taken out of the apparatus (without alteration in temperature) and is cooled quickly. Cooling can take place using air and the assistance of a fan, or in a refrigerator kept at some degrees above 0°C. The selenium solidifies and contracts at the same time, so that the solidified body thus formed can easily be removed from the glass vessel. The precipitation layer, with the impurities in the condition they were in during treatment, is now "frozen". The layer, having a depth of about 50 mm in the case in question, is removed. This can be done mechanically with a (glass) knife, but with a some risk of contaminating the selenium. A less risky method is to melt off the precipitation layer with a clean parting flame or by a heat radiation.

A special example of the purification method according to the present invention is given below with references to the Figures.

Heat is required to melt selenium the amount being about 6 KJ/mole. When selenium crystallises heat is released. This "heat-toning" can be used for alternating between the phases in the unstable precipitation area, and alternation can be repeated an optional number of times.

The hood 4, of the glass vessel according to FIG. 2 has, as has been stated above, a downward casing 18 for the contact thermometer. Immediately under the thermometer is placed the junction of an iron-constantan thermocouple 19. This is connected to a recording measuring device which continuously records the temperature in the precipitation layer. The pocket 18, with thermometer and thermocouple, is filled with a heat-conducting oil, e.g. a silicon oil. On each side of the casing two glass capillary tubes 21 and 22, having built-in conductors and platinum electrode tips are introduced into the selenium. These indicate the electrical conductivity resistance in the layer, which is recorded by the recorder. The controlling circuit 7 for the thermometer to the upper heating element 8 is connected to the recorder so that the time when the element 8 is giving off heat and the contact (at 15) is broken is recorded. The thermometer contact is set to 208°C. Instead of the contact thermometer, a control depending on the resistance to conductivity over the platinum electrodes may naturally be used as controlling means for the upper heat element.

FIG. 3 shows the graphs drawn by the recorder. The one graph shows the fluctuations in temperature in the precipitation layer. This graph reveals the repeated changes in the state of the selenium. The one extreme situation is a melt of amorphous selenium with no symmetry, while the other is polycrystalline selenium with great symmetry. That the phase changes really do take place is confirmed by the other graph of the electrical conductivity resistance. It is known that this resistance in crystalline selenium is considerably lower than in amorphous selenium. Within the temperatures 200°–200°C the specific resistance for selenium in a crystalline state is about 0,1 M$\Omega$cm, and in the amorphous state about 1.0 M$\Omega$cm. (F. Eckart, "Leitfahig-keits-Messungen am Selen," Annalen der Physik, Band 14, Heft 6–8, 1954). When its temperature decreases, as shown by the temperature — time graph, the selenium begins to crystallize, whereas its electrical resistance decreases at the same time, as shown by the resistance — time graph. When the temperature increases more and more selenium becomes melted and amorphous, while the resistance increases. The fluctuations in the resistance-time graph are completely coincidental with the fluctuations in the temperature — time graph. The amplitude for resistance alteration is about $\mp 0.2$ M$\Omega$cm. The periods of time when element 8 is turned on are shown in the diagram by the cross-hatched areas. We have found it suitable for the element to be turned on for about half the period. A suitable frequency is as shown in FIG. 3, with 3 periods per hour. It is possible to alter the frequency by altering the supply and removal of heat, which in turn is dependent on the size of the element, amount of cooling and size of cooling surfaces.

The result of the purification method can be illustrated by the following example. A so called "high purity" selenium, produced according to the best technique known up to the moment has been used as the initial material for further purification. In order to determine the quality of the selenium, it was analyzed with respect to a large number of possible incorporated impurities. The analytical methods used for this have the greatest sensitivity and accuracy which can be attained in any way with today's technology, and usually take the form of spectral analysis methods. The results were summarized in the table below. The determination level of the methods of analysis have been given in grams of impurity per metric ton selenium. The content of the impurities in question in selenium cannot be determined below this level. This does not mean, however, that impurities are not present in the selenium, but that if an impurity is present it is in an extremely small amount. Contents under or equivalent to the level of determination are given in the table by (—).

For the selenium taking part, which was very pure, the content of all the impurities in the analysis lie at or below the level of determination, as can be seen from the table. Even so, after purification by precipitation it may be noted that the selenium previously contained quite a few impurities which were concentrated into the precipitation layer in such quantities that they could be analytically determined. As the amount of the precipitation layer in this case has been chosen to be about 10% of the whole quantity of selenium, it is thus theoretically possible to obtain a purification factor of about 10 times. In this case, the impurity content in the precipitation layer can be at a maximum of about 10 times the figure for that of the determination level. This means that the total content in the untreated selenium is precisely at the level of determination, and that afterwards all impurities have been concentrated in the precipitation layer. In reality, the contents in the layer are lower, which may mean that the impurity in the selenium taking part was much below the level of determination, or that purification efficiency has not been 100%. From what has been said, it may be clearly seen that one cannot usually quantitatively state how much more pure the selenium has become by being put through this treatment, although it may be seen from the table that considerable results can be attained by the treatment, and this is surprising, when taking into account the extremely low impurity contents which are in question here.

Table

Analysis findings in grams/metric ton

| Element | Determination level | Content initially in selenium | Content in precipitation layer |
|---|---|---|---|
| Ag | 0.03 | (-) | 0,1 |
| Al | 0.3 | (-) | 2 |
| As | 1 | (-) | 5 |
| Au | 0.3 | (-) | (-) |
| Bi | 0.1 | (-) | (-) |
| Br | 0.5 | (-) | 1.8 |
| Ca | 1 | (-) | 3 |
| Cl | 0.5 | (-) | 3.5 |
| Cr | 0.3 | (-) | 1 |
| Cu | 0.1 | (-) | 0.5 |
| Fe | 0.3 | (-) | 2 |
| Hg | 0.5 | (-) | 0.6 |
| I | 0.5 | (-) | 1.2 |
| K | 0.3 | (-) | (-) |
| Mg | 0.3 | (-) | 2 |
| Mn | 0.1 | (-) | (-) |
| Na | 0.1 | (-) | 0.7 |
| Ni | 0.3 | (-) | 1 |
| O | 0.5 | (-) | 0.9 |
| Pb | 0.3 | (-) | 1.5 |
| S | 0.5 | (-) | 0.7 |
| Sb | 1 | (-) | (-) |
| Si | 1 | (-) | 8 |
| Sn | 0.3 | (-) | (-) |
| Te | 1 | (-) | (-) |
| Tl | 1 | (-) | (-) |
| Zn | 1 | (-) | (-) |

(−) signifies that content is the same as, or lower than, the determination level for the method of analyses.

In certain cases effective purification is obtained without this being clearly demonstrated by the analysis values. This applies when the impurities which can be precipitated in the precipitating zone are combined into volatile compounds with a relatively high vapor pressure. These compounds are vaporized successively from the surface and are exhausted via the vacuum system. This applies to oxygen, arsenic and the halogens as well as possibly lead, tin and bismuth. Oxygen and arsenic are precipitated as $As_2O_3$. Aggregates of crystallized cubic $As_2O_3$ have been shown by infrared analysis on the surface of the selenium and on the cooled glass surfaces of the hood, which indicates an even further improved purification. Oxygen can probably also be volatilized as selenium dioxide. Even halogens such as Cl, Br and I are concentrated but it is probable that some of these are disperse from the surface and are taken away through the vacuum system, possibly even as volatile compounds of Se or S. A concentration of sulphur in the layer has more seldom been able to have been shown, although it has been possible to show that the content of sulphur was lower in the purified than in the initial selenium. There can therefore be a purifying effect even with regard to sulphur, although this cannot usually be demonstrated analytically. Enrichment of silica is very usual, but as this is larger than what corresponds to the content in the original selenium it is probable that a part of the silica in this case could be traced to the glass walls of the vessel. Some other elements, such as Al, Mg, Ca, Na and K, which are also concentrated, may to a certain extent be derived to the glass vessel as these are also common in glass.

This thermic purification can be also applied to compounds or alloys of selenium. An example is arsenic — selenium alloys such as arsenic tetra selenide, $AsSe_4$, having about 20% As and a fusion temperature of about 150°C. It is produced directly from the elements and forms a liquid as does the pure selenium. On solidification a X-ray amorphous solid phase is formed, but probably a X-ray with higher symmetry than the liquid. The purification of arsenic-tetra selenide from oxygen is of especial interest. Arsenic selenides are used technically for the arsenic doping of selenium for photo-electrical purposes. Oxygen is very troublesome when using arsenic tetra selenide for such purposes. It is very difficult to produce oxygen-free arsenic selenide, as the oxygen is easily introduced into the alloy with the arsenic. Oxygen is easily combined with arsenic to form $As_2O_3$ in the transition zone when handling arsenic selenide, as has been previously described for selenium. Surface temperature in this case can be kept within the range 148°–152°C and the temperature at the bottom of the vessel about 100° higher. As an example, it may be said that a material which initially contains 300 grams oxygen per metric ton only contained 5 grams/metric ton after a couple of days of purification. After quick cooling, the selenide may be removed from the vessel and handled without risk of oxygen absorbtion.

Precipitation purification according to the invention, such as it has been described here, is also in principle possible to perform on elements other than selenium and arsenic tetra selenide. Such elements or alloys of elements which may come into question are Sb, Bi, Cd, Pb, Li, K, Cs, In, Ca, Na, S, Te, Ga, Tl, Sn and Zn. Most relevant are such metals and alloys having similar thermic properties to selenium. It is especially favourable if, as it is with selenium, crystallization or some other structural re-grouping towards increased symmetry takes place at the same time as the phase transition from liquid to solid.

The invention has certain associations to the well-known zone purifications method for the intensive purification of selenium. Here a melting zone is taken through the selenium body. The distribution of impurities between solid and liquid state is utilized, where many impurities are concentrated in the liquid phase. There are, however, essential differences on the practical application of the method according to the invention, which are shown from the above. According to the invention, the transition between solid and liquid phase takes place in a fixed position in regard to position and temperature. The main mass of selenium is liquid during purification, and further, a low vapor pressure is maintained above the selenium surface, allowing certain impurities successively to be removed. There are also large principle differences between this thermic purification and zone purification, with regard to the chemical — physical cycles of events taking place during purification.

I claim:

1. A method for producing selenium of extremely high purity from commercial grade selenium of high purity containing not over 0.1 to 1 gram/metric ton of impurities comprising introducing said commercial grade selenium into a receptacle, regularly varying the temperature of the surface of said selenium between 206° and 210°C. and maintaining the remainder of the selenium at a higher temperature for a period of time of some weeks to several months.

2. The method according to claim 1 including applying a partial vacuum to the surface of the selenium to separate volatile matter separated from the selenium in a gaseous phase.

3. The method according to claim 1 including cooling quickly the selenium melt to a temperature under its melting point and removing that portion of the selenium maintained between 206° and 210°C.

* * * * *